US006067512A

United States Patent [19]
Graf

[11] Patent Number: 6,067,512
[45] Date of Patent: May 23, 2000

[54] FEEDBACK-CONTROLLED SPEECH PROCESSOR NORMALIZING PEAK LEVEL OVER VOCAL TRACT GLOTTAL PULSE RESPONSE WAVEFORM IMPULSE AND DECAY PORTIONS

[75] Inventor: Joseph T. Graf, Robins, Iowa

[73] Assignee: Rockwell Collins, Inc., Cedar Rapids, Iowa

[21] Appl. No.: 09/052,369

[22] Filed: Mar. 31, 1998

[51] Int. Cl.[7] .............................. G01L 21/00; G01L 11/04
[52] U.S. Cl. .............................................. 704/225; 704/224
[58] Field of Search ...................................... 704/224, 225

[56] References Cited

U.S. PATENT DOCUMENTS 5,471,651 11/1995 Wilson ........................................ 455/72
5,812,969 9/1998 Barber, Jr. et al. ...................... 704/224
5,815,532 9/1998 Bhattacharya et al. ................. 375/301

*Primary Examiner*—David R. Hudspeth
*Assistant Examiner*—Tālivaldis Ivars Šmits
*Attorney, Agent, or Firm*—Kyle Eppele; James P. O'Shaughnessy

[57] ABSTRACT

A speech processor for processing speech signals in a manner that minimizes the peak to average ratio of a vocal tract response waveform of the speech signal with minimal loss of intelligibility of speech reproduced from the processed waveform. This is accomplished, in general terms, by providing a speech processor for providing an approximately constant peak level within periods of a vocal tract response waveform. The speech processor may include a feedback-controlled signal compressor multiplier and an input signal delay means. The attack, hang and decay parameters of the speech processor are determined in accordance with typical vocal tract response characteristics to optimize the balance between compression of the vocal tract response waveform and introduction of harmonics into the resulting signal. The gain of the speech processor is controlled in accordance with the input signal representing the vocal tract response waveform and is limited to prevent signal distortion when little or no signal is present. The input to the speech processor signal multiplier is delay compensated by an amount determined in accordance with the attack time and the sample rate of the input signal, such that the peak of an impulse portion of the vocal tract response waveform enters the speech processor at approximately the instant that speech processor gain has been adjusted to an appropriate level for the peak of the impulse portion.

19 Claims, 3 Drawing Sheets

FEEDBACK-CONTROLLED SPEECH PROCESSOR NORMALIZING PEAK LEVEL OVER VOCAL TRACT GLOTTAL PULSE RESPONSE WAVEFORM IMPULSE AND DECAY PORTIONS

FIELD OF THE INVENTION

The invention pertains to the field of speech processing. The invention addresses the problem of minimizing the peak to average ratio of a waveform representing human speech.

BACKGROUND OF THE INVENTION

In applications involving transmission of signals representing human speech, it may be desirable to maximize transmission power in order to maximize the range and clarity of a transmitted signal. In accordance with conventional practice, a peak clipper may be used to reduce the amplitude of peaks in the signal to raise the peak to average ratio of the signal to provide higher average output. However, peak clipping introduces undesirable harmonics into the signal. Alternatively, conventional signal compression may be used to reduce signal peaks. However, such techniques are generally unsatisfactory because they produce excessive attenuation of signal components immediately following spikes in the signal. This can lead to signal drop out and loss of intelligibility of the resulting signal.

SUMMARY OF THE INVENTION

It has been determined that voiced human speech waveforms may be regarded as pseudo-periodic phenomena. Each period of the pseudo-periodic waveform corresponds to a glottal pulse. The glottal pulse is a mechanical impulse of the glottis ("vocal chords") that creates an impulse of air within the vocal tract, followed by a rest period. The impulse generates an acoustic wave (referred to hereinafter as a vocal tract response) that reverberates through the vocal tract. Each period of the vocal tract response is comprised of an impulse portion corresponding to the impulse of the glottis, and a decay portion during which the vocal tract response exhibits a damped resonance until the occurrence of the next glottal impulse. Attenuation of the impulse portion of the vocal tract response to approximately the level of the decay portion of the vocal tract response (or, equivalently, amplification of the decay portion to approximately the level of the impulse portion) in accordance with the invention produces a waveform that improves the peak to average ratio of the waveform while producing minimal impact on the spectrum of the waveform and consequently a minimal loss of intelligibility of speech generated therefrom.

It is therefore an object of the invention to provide a speech processor for processing speech signals in a manner that minimizes the peak to average ratio of the speech waveform with minimal loss of intelligibility of speech reproduced from the processed waveform. It is a further object of the invention to provide a speech processor for use in a radio transmitter for providing an output signal having a maximum average transmission power by minimizing the peak to average ratio of transmitted speech signals and producing a speech signal exhibiting minimal loss of intelligibility at the receiver in comparison to the input speech signal at the transmitter. It is a further object of the invention to provide a speech processor for suppressing the impulse portions of periods of a signal representing a vocal tract response waveform in a manner that results in minimal loss of intelligibility in speech generated from the processed signal.

The invention accomplishes these objects, in general terms, by providing a speech processor for changing the amplitudes of impulse portions and decay portions of a vocal tract response waveform such that they are approximately the same. A speech processor in accordance with the invention may include a feedback-controlled compressor signal multiplier and an input signal delay means. The attack, hang and decay parameters of the speech processor are determined in accordance with typical vocal tract response characteristics to optimize the balance between compression of the impulse portions of the vocal tract response waveform and introduction of harmonics into the resulting signal. The gain of the speech processor is controlled in accordance with the input signal which represents a speech waveform. The input to a feedback-controlled speech processor signal multiplier is delay compensated by an amount determined in accordance with the attack time and the sample rate of the input signal, such that the peak of an impulse portion of a vocal tract response portion of the speech waveform enters the speech compressor at approximately the instant that speech processor gain has been adjusted to an appropriate level for the peak of the impulse portion.

A detailed description of generic and preferred embodiments of the invention, as well as manners for formulating alternative embodiments, are provided below.

DESCRIPTION OF THE DRAWINGS

The invention and its various embodiments will be understood through reference to the following detailed description and the accompanying figures, in which.

DETAILED DESCRIPTION OF THE INVENTION AND PREFERRED EMBODIMENTS THEREOF

Figure 1:
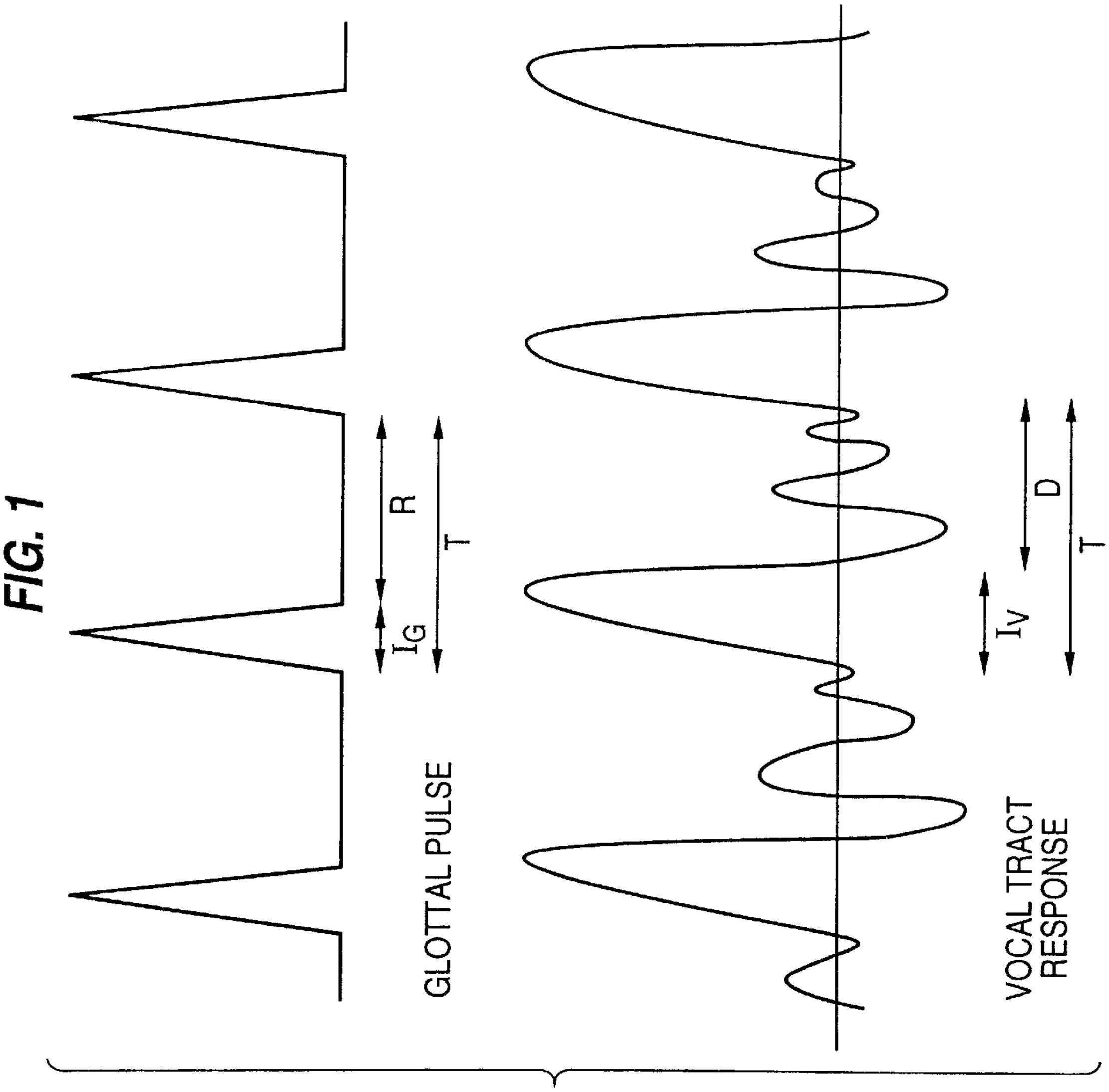
FIG. 1 shows an exemplary glottal pulse waveform and a corresponding exemplary pseudo-periodic vocal tract response waveform.

Reference is made first to FIG. 1, which shows an exemplary glottal pulse waveform and a corresponding pseudo-periodic vocal tract response waveform. It is noted that the glottal pulse is a phenomena that is associated with voiced speech. Human speech also includes a variety of "unvoiced" components, such as many of the sounds used to express consonants, that do not involve the action of the glottis. Unvoiced components therefore do not exhibit the periodic characteristics associated with voiced speech.

The illustrated portion of the glottal pulse waveform is pseudo-periodic with a period T. Within each period are distinct impulse periods $I_G$ and rest periods R. It has been determined that the glottal pulse frequency in humans may range from as low as 50 Hz in some males, up to approximately 200–300 Hz in some females. Consequently, the typical glottal pulse period T is in the range of 0.0033 s to 0.02 s.

The illustrated portion of the vocal tract response waveform is similarly pseudo-periodic with a period T corresponding to the period T of the glottal pulse waveform. The vocal tract response waveform is composed of distinct impulse and decay portions having respective periods $I_V$ and D. The peak values in the impulse portion $I_V$ are significantly greater than those of the decay portion D because they correspond directly to the impulse portion of the glottal pulse waveform.

A significant portion of the dynamic range of the vocal tract response waveform is therefore occupied only by the impulse portion, causing the waveform to have a relatively high peak to average ratio as a whole in comparison to the peak to average ratio of the decay portion of each period. It is therefore desirable to alter the waveform such that the impulse portion of each period has approximately the amplitude of the decay portion without causing significant introduction of harmonics or drop-out of the decay portion. It will be appreciated that the decay period D decreases as a percentage of the glottal pulse period with increasing glottal pulse frequency, and therefore the peak to average ratio of the decay portion of each period of the vocal tract response approaches that of the waveform as a whole with increasing glottal pulse frequency. Consequently, the benefit of waveform alteration increases with decreasing glottal pulse frequency.

Figure 2:
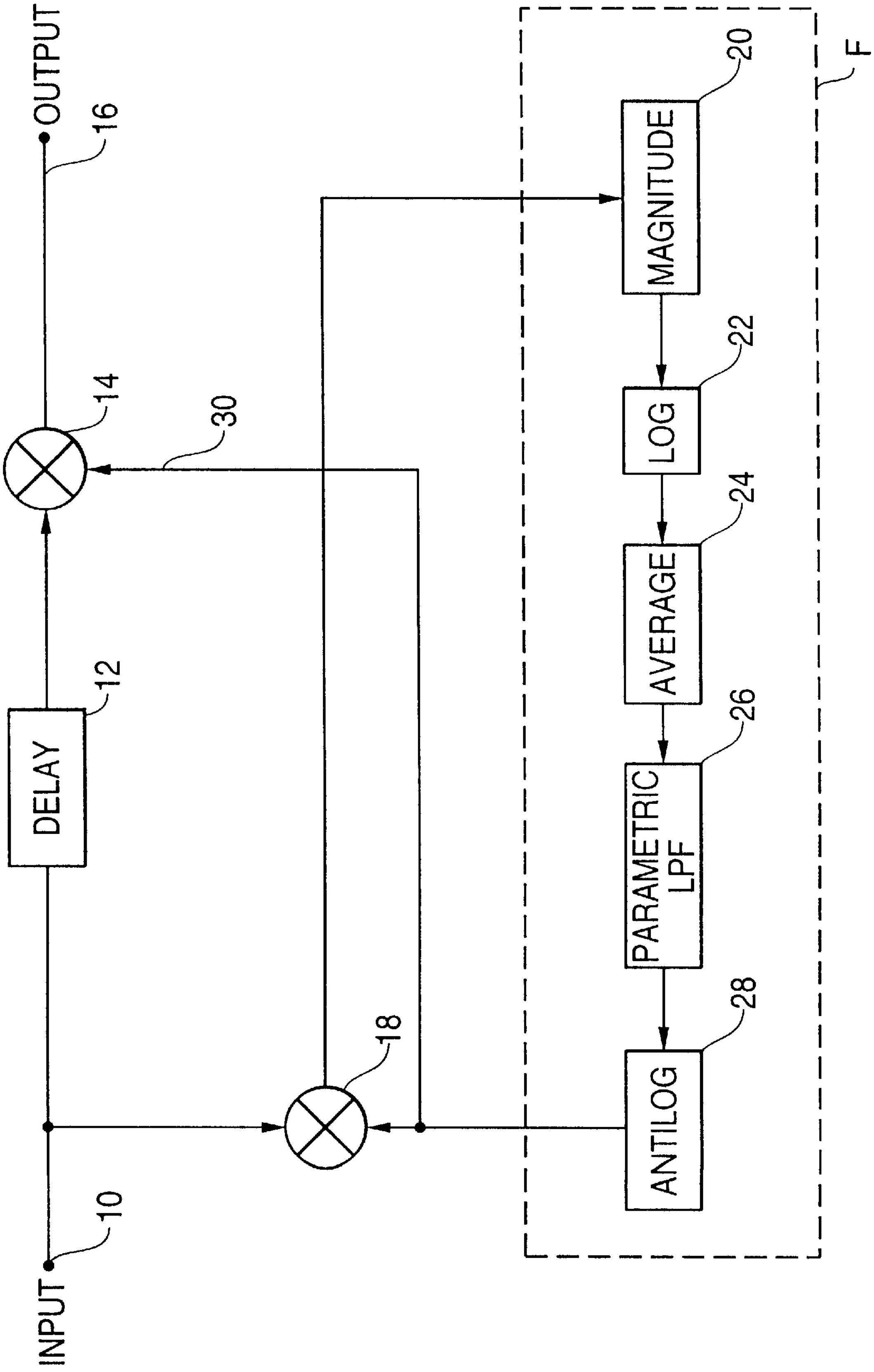
FIG. 2 shows, in generic form, a speech processor for processing waveforms representing a vocal tract response in accordance with the invention.

Reference is now made to FIG. 2, which illustrates a generic speech processor in accordance with the invention. As seen in FIG. 2, the speech processor includes an input 10 for receiving an input signal representing a speech waveform. For purposes of discussion of the generic embodiment illustrated in FIG. 2, it will be assumed that the input signal is in digital form with a sampling rate of 8 kHz; however, those having ordinary skill in the art will recognize that the input of the illustrated embodiment may include an analog to digital (A/D) convertor where the input signal is in analog form.

The input signal is provided through a delay unit 12 to a signal multiplier 14 where the signal from the delay unit is multiplied in accordance with a gain control signal received on a control line 30 from a feedback stage F constituted by elements 20–28, discussed below. The gain control signal provided by the feedback loop represents a gain factor for amplifying the delayed input signal. The delay unit may comprise, for example, a latch, and the delay provided by the unit is such that the peak of an impulse portion of a vocal tract response portion of the speech waveform enters the signal multiplier 14 at approximately the instant that the gain of the signal multiplier has been adjusted to an appropriate level for suppressing the peak of the impulse portion to a desired level. This amount of delay may be determined in accordance with the response time of the feedback loop, the response time of the signal multiplier 14, and the sampling rate of the input signal.

As described above, the feedback stage F provides a control signal for controlling the gains of speech processor signal multiplier 14 and 18. The feedback stage receives a multiplied input signal from compressor signal multiplier 18 at magnitude generator 20. The magnitude generator 20 provides a signal representative of the magnitude of the multiplied input signal to a log converter 22 that converts the magnitude to log form. The output of the log convertor is received by an averager 24 that averages the magnitude over an appropriate number of samples such that the averager generally follows peaks within periods of a vocal tract response portion of the speech waveform. For the exemplary sampling rate of 8 kHz, an averaging over three samples has been found to provide an appropriate average signal.

The signal from the averager is received by a parametric low pass filter (lpf) 26. The parametric lpf has adjustable attack, hang and decay times and thresholds that are selected so that the output signal of the parametric lpf follows the peaks within periods of the vocal tract response portion of the speech waveform. In practice, an attack time of 0.5 milliseconds, a hang time of 0 m seconds and a decay time of 7 milliseconds, and attack and hang thresholds of −16 dB relative to full scale, have been found to produce an appropriate gain control signal for suppression of impulse portions of a 50 Hz pseudo-periodic vocal tract response waveform. The over-all compression gain is also limited to 10 dB to prevent distortion that may be introduced as a result of the weakest part of the decay portion or in the absence of a signal.

The signal from the parametric lpf is provided to an antilog convertor 28, and the signal from the antilog convertor is provided as a gain control signal to the compressor signal multiplier 18, where the input signal is multiplied and fed to the magnitude generator 20. The output signal of the antilog convertor also comprises the gain control signal provided over the control line 30 to speech processor signal multiplier 14. Through the action of the feedback stage F, the gain control signal is varied to produce an approximately steady peak level within periods of vocal tract response portions of the speech signal. Through the action of the delay unit 12, the input signal is delayed by an appropriate amount such that the peak of an impulse portion of a vocal tract response waveform enters the speech processor signal multiplier 14 at approximately the instant that the gain of the speech processor signal multiplier has been adjusted by the control signal to an appropriate level for the peak of the impulse portion. The speech processor signal multiplier 14 accordingly provides an output signal at output 16 that has an approximately steady envelope across the impulse portions and decay portions of periods of the vocal tract response waveform.

Figure 3:
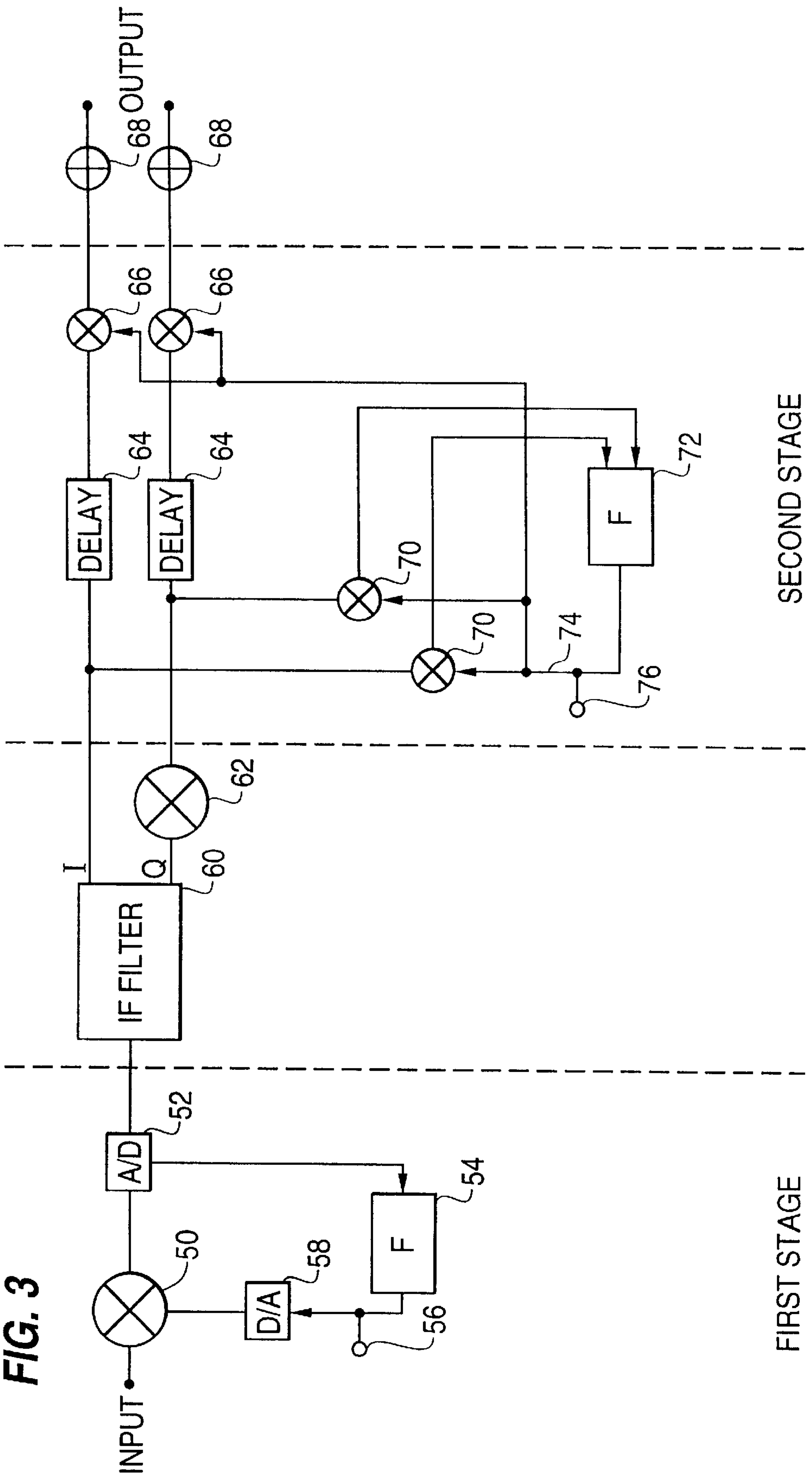
FIG. 3 shows a speech processor for a radio transmitter in accordance with an embodiment of the invention.

Reference is now made to FIG. 3, which shows a speech processor of a radio transmitter in accordance with an embodiment of the invention. As seen in FIG. 3, the embodiment comprises first and second processing stages. An analog input signal is received at an analog signal multiplier 50 of the first processing stage. Within the first stage, the signal from the analog signal multiplier 50 is provided to an A/D convertor 52, and the output of the A/D convertor is provided to a feedback stage 54. The feedback stage is substantially the same as that illustrated and discussed with regard to FIG. 2. In the embodiment of FIG. 3, the elements of the feedback stage provide an output gain control signal for the analog signal multiplier 50. The elements of the feedback stage 54 are configured such that the gain control signal produces an analog output signal of the analog signal multiplier 50 having an approximately steady impulse portion peak amplitude across periods of a vocal tract response portion of a speech waveform represented by the input signal. In practice, an attack time of 20 milliseconds, a hang time of 200 milliseconds and a decay time of 100 milliseconds, and an attack threshold of −12 dB and hang threshold of −13 dB relative to full scale have been found to provide an appropriate gain control signal.

The output gain control signal of the feedback stage is converted to an analog gain control signal at a digital to analog (D/A) convertor 58 and provided to the analog signal multiplier 50 as a gain control signal. The first processing stage thereby functions to produce a first output signal representing a first processed speech waveform having a steady impulse portion peak amplitude across periods of the vocal tract response waveforms represented by the input signal.

It will be noted that a switch 56 may be provided between the feedback stage 54 and D/A convertor 58 for disabling the feedback stage. This results in nominal gain at the signal multiplier, which is desirable where the transmitter may be used for either voice or data transmission.

The first output signal of the first processing stage is also provided by the A/D convertor 52 to an IF filter 60, such as an FIR filter, for generating respective in-phase and quadrature signals I and Q. The Q signal may be provided to a sideband signal multiplier 62 for providing appropriate sideband selection.

The I and Q signals are provided as input signals to the second processing stage, where they are received by respective delay units 64. Delayed I and Q signals are provided by the delay units 64 to corresponding speech processor signal multipliers 66. The speech processor signal multipliers 66 also receive a gain control signal over gain control line 78. The gain control signal is output by a feedback stage 72 which is essentially analogous to that described with respect to the embodiment of FIG. 2. A notable difference in the feedback stage of FIG. 3 is that the magnitude generator of FIG. 3 produces an output equal to the quantity $(I^2+Q^2)^{1/2}$. As in the case of the embodiment of FIG. 2, the feedback stage 72 provides a gain control signal that is varied to produce an approximately steady peak amplitude across the impulse portions and decay portions of periods of a vocal tract response waveform represented by the first processed speech signal. Through the action of the delay units 64, the I and Q signals are delayed by an appropriate amount such that the peaks of impulse portions of a vocal tract response waveform represented by the first processed speech signal enter the speech processor signal multipliers 66 at approximately the instant that the gains of the speech processor signal multipliers are adjusted by the control signal to an appropriate level for the peak of the impulse portion. The speech processor signal multipliers 66 accordingly provide output signals that have an approximately steady peak amplitude across the impulse portions and decay portions of periods of the vocal tract response waveform represented by the first processed speech signal. These signals may then be provided to signal adders 68 for carrier insertion.

While the embodiment of the invention discussed with regard to FIG. 3 represents a preferred embodiment for use in a radio transmitter, a variety of alternative embodiments may be formulated from the present disclosure in accordance with the knowledge possessed by those having ordinary skill in the art. For example, an alternative embodiment may be provided comprising the first processing stage of the embodiment illustrated in FIG. 3, providing an output signal to a second processing stage comprising the generic embodiment of FIG. 2. Likewise, those having ordinary skill in the art may implement a wide variety of alternative embodiments in accordance with the generic embodiment discussed with regard to FIG. 2. For example, those having ordinary skill in the art will recognize that the object of the invention may be achieved through either suppression or amplification of appropriate waveform portions. In addition, those having ordinary skill in the art will be aware of a variety of manners for implementing signal adders, signal multipliers, delay units, A/D convertors, D/A convertors, filters and feedback stages in accordance with the novel performance specifications disclosed herein. It will therefore be appreciated that the invention is not limited to the implementations specifically described herein, but rather encompasses all devices possessing the combinations of features defined in the claims set forth below.

What is claimed is:

1. A speech processor comprising:

a compressor signal multiplier for varying an amplitude of an input signal representing a speech waveform in accordance with a gain control signal and for providing a multiplied input signal;

a feedback stage for receiving the multiplied input signal from the compressor multiplier and for providing the gain control signal representing a gain for providing an approximately constant peak level over an impulse portion and a decay portion within glottal pulses of a vocal tract response waveform represented by the input signal;

a speech processor signal multiplier for varying the amplitude of the input signal representing the speech waveform in accordance with the gain control signal and for providing an output signal; and a delay means for providing the input signal to the speech processor signal multiplier such that the gain of the speech processor signal multiplier is adjusted to a desired level for a peak of the impulse portion of the vocal tract response waveform represented by the input signal at approximately the instant that the portion of the input signal representing the peak of the impulse portion is input to the speech processor signal multiplier.

2. The speech processor claimed in claim 1, wherein the feedback stage comprises:

means for providing a signal representing an average amplitude of the input signal; and means for providing the gain control signal in accordance with said signal representing said average amplitude.

3. The speech processor claimed in claim 2, wherein the means for providing the gain control signal comprises a parametric low pass filter.

4. The speech processor claimed in claim 3, wherein said parametric low pass filter has an attack time of approximately 0.5 milliseconds, a hang time of approximately 0 seconds, a decay time of approximately 7 milliseconds, and attack and hang thresholds of approximately −16 dB relative to full scale.

5. A speech processor for a radio transmitter comprising:

a first processing stage for receiving an input signal representing a speech waveform, producing a first output signal representing a first processed speech waveform having an approximately constant peak level of impulse portions of glottal pulse periods of a vocal tract response represented by the speech waveform, and feeding back said first output signal to produce the first output signal; and a second processing stage for receiving said first output signal and producing a second output signal representing a second processed speech waveform having an approximately constant peak level across the impulse portions and decay portions within glottal pulses of the vocal tract response.

6. The speech processor claimed in claim 5, wherein said first processing stage comprises:

an analog signal multiplier for varying an amplitude of said input signal in accordance with a control signal to provide an analog output signal;

an A/D converter for converting the analog output of the analog signal multiplier to the first output signal;

a feedback stage for receiving the first output signal from the A/D converter and for providing the control signal representing a gain for providing an approximately constant peak level of the impulse portions of glottal pulse periods of the vocal tract response waveform; and a D/A converter for converting the control signal from the feedback stage to an analog gain control signal for the analog signal multiplier.

7. The speech processor claimed in claim 6, wherein the feedback stage comprises:

means for providing a signal representing an average amplitude of the input signal; and means for providing the gain control signal in accordance with said signal representing said average amplitude.

8. The speech processor claimed in claim 7, wherein the means for providing the gain control signal comprises a parametric low pass filter.

9. The speech processor claimed in claim 5, wherein said second processing stage comprises:

a compressor signal multiplier for varying an amplitude of said input signal in accordance with a gain control signal and for providing a multiplied input signal;

a feedback stage for receiving the multiplied input signal from the compressor multiplier and for providing the gain control signal representing a gain for providing an approximately constant peak level for the impulse portion and the decay portion within glottal pulse periods of the vocal tract response waveform;

a speech processor signal multiplier for varying the amplitude of the input signal representing the speech waveform in accordance with the gain control signal and for providing the output signal; and a delay means for providing the input signal to the speech processor signal multiplier such that the gain of the speech processor signal multiplier is adjusted to a desired level for a peak of the impulse portion of the vocal tract response waveform represented by the input signal at approximately the instant that the portion of the input signal representing the peak of the impulse portion is input to the speech processor signal multiplier.

10. The speech processor claimed in claim 9, wherein the feedback stage comprises:

means for providing a signal representing an average amplitude of the input signal; and means for providing the gain control signal in accordance with said signal representing said average amplitude.

11. The speech processor claimed in claim 10, wherein the means for providing the gain control signal comprises a parametric low pass filter.

12. A speech processor for a radio transmission device comprising:

a first processing stage for receiving an input signal representing a speech waveform and producing a first output signal representing a first processed speech signal waveform having an approximately constant peak level of impulse portions of glottal pulse periods of a vocal tract response represented by the speech waveform, and feeding back said first output signal to produce the first output signal;

a filter for receiving said first output signal and producing a first in-phase signal and a first quadrature signal each representing said first processed speech waveform; and a second processing stage for receiving said first in-phase signal and said first quadrature signal and producing a second in-phase signal and second quadrature signal representing a second processed speech waveform having an approximately constant peak level across impulse portions and decay portions within glottal pulses of the vocal tract response waveform.

13. The speech processor claimed in claim 12, wherein said first processing stage comprises:

an analog signal multiplier for varying an amplitude of said input signal in accordance with a control signal to provide an analog output signal;

an A/D converter for converting the analog output signal of the analog signal multiplier to the first output signal;

a feedback stage for receiving the first output signal from the A/D converter and for providing the control signal representing a gain for providing an approximately constant peak level of impulse portions of glottal pulse periods of the vocal tract response waveform; and a D/A converter for converting the control signal from the feedback stage to an analog control signal for the analog signal multiplier.

14. The speech processor claimed in claim 13, wherein the feedback stage comprises:

means for providing a signal representing an average amplitude of the input signal; and means for providing the gain control signal in accordance with said signal representing said average amplitude.

15. The speech processor claimed in claim 14, wherein the means for providing the gain control signal comprises a parametric low pass filter.

16. The speech processor claimed in claim 12, wherein said second processing stage comprises:

a pair of compressor signal multipliers for varying amplitudes of said first in-phase signal and said first quadrature signal in accordance with a gain control signal and for providing multiplied first in-phase signals and multiplied first quadrature signals;

a feedback stage for receiving the multiplied first in-phase signal and the multiplied first quadrature signal from the compressor multipliers and for providing the gain control signal representing a gain for providing an approximately constant peak level within glottal pulse periods of the vocal tract response;

a pair of speech processor signal multipliers for varying the amplitudes of the first in-phase signal and the first quadrature signal representing the first processed speech waveform in accordance with the gain control signal and for producing the second in-phase signal and second quadrature signal representing a second processed speech waveform; and a delay means for providing the first in-phase signal and the first quadrature signal to the speech processor signal multipliers such that the gain of the speech processor signal multipliers are adjusted to a desired level for the peak of an impulse portion of the vocal tract response waveform represented by the first in-phase signal and the first quadrature signal at approximately the instant that the portion of the input signal representing the peak of the impulse portion is input to the speech processor signal multiplier.

17. The speech processor claimed in claim 16, wherein the feedback stage comprises:

means for providing a signal representing an average amplitude of the input signal; and means for providing the gain control signal in accordance with said signal representing said average amplitude.

18. The speech processor claimed in claim 17, wherein the means for providing the gain control signal comprises a parametric low pass filter.

19. The speech processor claimed in claim 13, further comprising a switch between said feedback stage and said analog signal multiplier for selectively providing one of the control signal and a unity gain signal to said analog signal multiplier.

* * * * *